Patented Feb. 29, 1944

2,342,856

UNITED STATES PATENT OFFICE 2,342,856

REGENERATION OF A CONTACT CATALYST

Homer J. Hall, Roselle, N. J., assignor to Standard Oil Development Company, a corporation of Delaware No Drawing. Application November 13, 1939, Serial No. 304,143

2 Claims. (Cl. 252—242)

The present invention relates to regeneration of catalysts of the contact type, which have become contaminated with combustible deposits, by oxidation of said deposits with carbon dioxide in the presence of a nickel type catalyst, and the said invention is fully disclosed in the following description and claims.

In the catalytic treatment of hydrocarbon oils, to form hydrocarbons relatively lighter than the original material, or to isomerize, hydrogenate, or otherwise purify or refine such feed stocks, the process is generally carried out in the presence of an adsorbent material such as clays, zeolites, both natural and synthetic, pumice, solid gels, activated carbon, and the like. During the course of almost any such treatment a tarry carbonaceous deposit is formed on the adsorbent material which impairs its efficiency, and consequently the catalyst must be revivified or regenerated from time to time by removal of contaminants or poisons. The most common method of removing these catalyst contaminants is by oxidation with a gaseous medium containing a relatively small amount of free oxygen, such as ordinary air diluted with superheated steam or flue gas, or nitrogen, or some similar material. A great disadvantage of removing the tarry contaminants of a catalyst of the adsorbent type, is that the combustion or oxidation is apt to reach a temperature which will greatly impair or even destroy the activity of the catalyst due to baking or fusion. Numerous proposals, many of which involve complicated accessory apparatus, have been made for burning off the contaminants from a poisoned adsorbent catalyst and at the same time preventing the temperature during the combustion from exceeding some safe maximum. It has also been proposed heretofore in the treatment of activated carbons to employ carbon dioxide or steam as the oxidizing agent for converting the tarry deposit on the contact mass to a gaseous product. The proposal to use carbon dioxide or steam as the oxidizing medium is based on the fact that the reaction between carbon and carbon dioxide or steam to form CO is endothermic and that, therefore, the reaction could not overheat or bake the catalyst, thus destroying its efficiency. However, the temperature at which carbon may be oxidized by $CO_2$ at an appreciable rate lies within the range of from about 1200° F. to 1500° F. At lower temperatures, say within the range of 750° F. to 1000° F., the oxidation of carbon or hydrogen deficient hydrocarbons is extremely slow.

In the case of most contact agents of the nature of metallic oxides, temperatures of the order of 1200° F. to 1500° F. cause baking, fusion, and sintering of the catalyst. Even lower temperatures such as 1050° to 1200° F. may impair and injure the catalyst structure and its efficiency. Thus, catalysts such as bauxite, clay, zeolites, natural and artificial, silica gels, alumina gels and plural gels are in danger of impairment to their structure, adsorption capacity and efficiency when heated to temperature in excess of 1100° F.

I have now discovered that the tarry deposit formed, for example, on a zeolite catalyst during a refining operation, may be rapidly oxidized and removed at temperatures well below the baking or sintering temperatures of the most sensitive catalysts by employing a nickel promoter for the endothermic oxidation desired. I have discovered, for example, that a zeolite catalyst which has become contaminated with tarry deposits may be regenerated by the use of carbon dioxide in the presence of nickel at temperatures within the range of from about 1080° F. to about 860° F. I have further found that by employing an additional activating substance in the form of a difficultly reducible oxide such as manganous oxide, vanadium oxide, chromic oxide, uranium oxide, zinc oxide, alumina, cadmium oxide, copper oxide, magnesium oxide, alkali metal oxide, alkaline earth oxides in conjunction with nickel, the oxidation or combustion of tarry contaminants on a contact catalyst may be carried out at temperatures within the range of from about 960° F. to 740° F. Instead of using the oxide to activate the nickel, alkali metal carbonates, nitrates, molybdates and tungstates may be employed.

The most convenient method of employing the nickel oxidation promoter is to incorporate it in the contact catalyst, and the amount of the nickel catalyst should be within the range of from about ½ of 1% to about 10%, based on the weight of the contact catalyst. The amount of activating substance if used should be from about 2% to 20% based on the weight of the nickel promoter.

In order to give more details regarding my invention, the following examples are given with the understanding that the invention is not restricted to the precise details contained therein but includes obvious modifications which will readily occur to an expert in the catalytic art.

*Example 1*

100 grams of a pure grade of natural bauxite in 20 mesh granular form are impregnated with 100 grams of an aqueous solution containing 16 grams of nickel formate crystals, and thereafter the impregnated bauxite is slowly dried and then heated to a temperature of 500° F. to decompose the formate. The bauxite catalyst containing about 5% nickel by weight, may be used in a catalytic reforming operation in the presence or absence of small amounts of hydrogen-containing gases. During regeneration substantially pure carbon dioxide may be used to oxidize the contaminating poisons or tar deposited on the catalyst during the refining operation, as hereinafter more fully explained.

Very advantageous results are obtained by employing ½% of zinc oxide to activate the nickel. The zinc may be incorporated into the zeolite by impregnating the zeolite with a solution of zinc nitrate and then treating the impregnated zeolite with an alkali to precipitate the zinc oxide. This operation may be carried out before or after the zeolite has been impregnated with nickel.

*Example 2*

100 grams of an acid leached zeolite in powdered form were intimately mixed with 2 grams of a mixture containing 95% finely ground nickelous oxide and 5% sodium molybdate, according to known procedure.

The contact catalyst described in Example 2, containing a nickel oxidation promoter was employed in an oil cracking operation on a light gas oil feed stock, until the efficiency of the contact catalyst was impaired due to the deposition of a carbonaceous tarry deposit. The temperature of the catalyst during the oil cracking operation was maintained at about 920° F. After discontinuance of the cracking operation, the catalyst still at a temperature of about 920° F., was regenerated by forcing through it substantially pure carbon dioxide at a temperature of about 950° F. and under a pressure of about 45 lbs./sq. in. for a period of about 90 minutes, whereupon it was found that the activity of the contact catalyst had been fully restored by oxidation and combustion of the tarry deposits.

Instead of using a pure carbon dioxide it may be desirable to add a small amount of free oxygen, such as ½ of 1%, particularly during the last portion of the regeneration phase. Since the oxidation of carbon by carbon dioxide is an endothermic reaction, it may be necessary to counterbalance the heat absorption by an exothermic side reaction, such as the oxidation of carbon by oxygen. That is to say, considering a ninety minute regeneration period, it may be desirable to employ substantially pure carbon dioxide during the first 80 minutes and during the last 10 minutes to incorporate into the carbon dioxide about 2% of free oxygen. In cases where a sufficient supply of substantially pure carbon dioxide is not available, it is advantageous to use a suitable flue gas or other industrial gas having a large concentration of carbon dioxide, and a very low content of free oxygen. In such cases, the regeneration may, if desired, be carried out under superatmospheric pressure sufficient to increase the partial pressure of carbon dioxide to one atmosphere or greater. Also the regeneration off gases may be recycled, after a suitable oxidation process to oxidize the carbon monoxide formed during regeneration. This type of operation will serve to increase the temperature of the recycle gases, to make up for the heat lost in the endothermic reaction of carbon dioxide with the coke on the catalyst.

The application of this invention is not limited to any particular type of hydrocarbon conversion or any particular feed stock. The invention is not directed toward the conversion or refining process used, which may be of any known type. Certain feed stocks containing large amounts of sulfur or sulfur compounds are known to poison nickel catalysts. Feed stocks of this type may be subjected to a preliminary desulfurization treatment, particularly in cases where the catalysts to be regenerated, according to this invention, are used in a catalytic refining step which is part of a combination process involving some preliminary catalytic treatment. In any case, the amount of sulfur containing feed stocks fed to the refining catalyst should be limited so that all of the free nickel available is not used up. Where a partially sulfided nickel catalyst is being regenerated according to this invention, it is necessary to use oxygen or an oxygen containing gas to complete the reactivation of the sulfided nickel. The final oxidation is carried out after the coke has been burned off by regeneration in the presence of carbon dioxide, so that the danger of a harmful temperature rise during the exothermic oxidation of coke is no longer present.

My process is not limited to regeneration in any particular type of apparatus; that is to say, the process may be conveniently carried out by regenerating the catalyst in situ whether the catalyst is in the form of an elongated continuous bed, supported on trays, contained in reaction tubes or obviously the catalyst may be regenerated outside of the reaction zone proper, using any standard equipment for supplying the regeneration gas and withdrawing the products of combustion or oxidation. Also, the time of the regeneration may vary from the figures set forth above due to the amount and nature of the contaminating material. The temperature drop through the reactor during regeneration may be offset by increasing the inlet temperature of the regenerating gases, or in part by using a gas containing controlled small amounts of oxygen or air, as indicated above. The temperature maintained during the regeneration may vary from 1000° F. to 570° F. The back pressure on the system may vary from 5 lbs. to 125 lbs. gauge and the amount of oxygen, if any is used, may vary about and below the 2% mentioned above. The total volume of regeneration gas operating, say at 970° F. under a gauge pressure of 45 lbs. may, with good results, be 3000 volumes per volume of catalyst per hour where the catalyst contains about 1% by weight of a hydrogen deficient hydrocarbon in the form of a tar-like deposit.

What I claim is:

1. In the process of regenerating a cracking catalyst contaminated with 1% or more of a tarry carbonaceous contaminant which comprises forcing through the catalyst a gas substantially free of elemental oxygen and containing a large quantity of carbon dioxide, at temperatures above about 750° F. but below about 1100° F., to remove more of the carbonaceous contaminant in an endothermic reaction, the improvement comprising incorporating into the catalyst before use about 1 to 3% nickel and a small amount of zinc oxide.

2. The regeneration of a contact catalyst useful in the conversion of hydrocarbon oils and being one of the class consisting of zeolitic clays, bauxite and synthetic gels, which comprises incorporating a relatively small amount of nickel in said catalyst prior to use in said hydrocarbon conversion and treating the catalyst, following use in said conversion wherein it is contaminated with carbonaceous deposits, during regeneration with a gas comprising essentially carbon dioxide at temperatures above 700° F. but below 1100° F.

HOMER J. HALL.